(12) United States Patent
Loa

(10) Patent No.: US 6,314,095 B1
(45) Date of Patent: Nov. 6, 2001

(54) METHOD AND APPARATUS FOR A HIGH-SPEED MULTIMEDIA CONTENT SWITCH WITH COMPRESSED INTERNET PROTOCOL HEADER

(75) Inventor: Kanchei Loa, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/248,653

(22) Filed: Feb. 11, 1999

(51) Int. Cl.[7] ............................. H04L 12/66; H04J 3/18; H04B 1/66

(52) U.S. Cl. .................. 370/352; 370/401; 370/477; 370/521; 375/240; 348/384.1

(58) Field of Search .................................. 370/219, 230, 370/352, 355, 356, 392, 473, 401, 395, 409, 389, 465, 467, 521, 477; 375/219, 240; 348/348.1

(56) References Cited

U.S. PATENT DOCUMENTS

| | | | |
|---|---|---|---|
| 5,293,379 | * | 3/1994 | Carr ..................................... 370/474 |
| 5,307,413 | * | 4/1994 | Denzer .................................. 380/49 |
| 5,446,736 | * | 8/1995 | Gleeson et al. ....................... 370/473 |
| 5,535,199 | * | 7/1996 | Amri et al. ........................... 370/392 |
| 5,627,829 | * | 5/1997 | Gleeson et al. ....................... 370/230 |
| 5,633,891 | * | 5/1997 | Rebec et al. .......................... 375/219 |
| 5,673,322 | * | 9/1997 | Pepe et al. ............................ 380/49 |
| 6,115,384 | * | 9/2000 | Parzych ................................ 370/401 |

OTHER PUBLICATIONS

Viswanathan et al. "A Proposed Architecture For MPLS", Internet Draft, Jul. 1997.*

Rosen, E.C.; Cisco Systems, Inc.; Viswanathan, A.; Lucent Technologies; Callon, R.; Ironbridge Networks, Inc.; "Multiprotocol Label Switching Architecture" Network Working Group–Internet Draft; Feb. 1999; http://www.ietf.org/shadow.html.

Casner, S.; Jacobson, V.; "Compressing IP/UDP/RTP Headers for Low–Speed Serial Links" Feb. 1999; URL ftp://ftp.isi.edu/in–notes/rfc2508.txt.

Degermark, M.; Nordgren, B.; Pink, S.; "IP Header Compression" Feb. 1999; URL ftp: / / ftp.isi.edu/in–notes/rfc2507.txt.

* cited by examiner

Primary Examiner—Hassan Kizou
Assistant Examiner—Afsar M. Qureshi
(74) Attorney, Agent, or Firm—Heather L. Mansfield; Joanne N. Pappas; Terri S. Hughes

(57) ABSTRACT

An IP packet (210) is retrieved having a header and a payload. The header of the IP packet is compressed. The payload is appended to the compressed header to create a compressed IP packet. A multi-protocol label switch (MPLS) virtual circuit is established through a plurality of IP routers terminating at a destination of the IP packet. The compressed IP packet is converted into a MPLS packet (230). The MPLS packet (230) is transmitted through the MPLS virtual circuit. The MPLS packet is re-converted into the compressed IP packet at the destination. The compressed IP packet is decompressed at the destination (170).

15 Claims, 3 Drawing Sheets

METHOD AND APPARATUS FOR A HIGH-SPEED MULTIMEDIA CONTENT SWITCH WITH COMPRESSED INTERNET PROTOCOL HEADER

FIELD OF THE INVENTION

The present invention relates generally to method and apparatus for a high-speed multimedia content switch with compressed Internet Protocol header.

BACKGROUND OF THE INVENTION

Today's high-end Internet Protocol (IP) router is capable of switching several million packets per second (PPS). When a real-time transport protocol (RTP) header compression function is turned on for Voice over IP (VOIP) applications, however, the switching rate of the IP router is reduced to 10,000 PPS, which is equivalent to less than two (2) full duplex T1 compressed VoIP traffic.

The only solution today is to use a faster central processing unit (CPU) on the IP router for RTP header compression and IP switching tasks. A two hundred megahertz (200 MHz) CPU on the Cisco™ 7500 router could increase the packet-processing rate to 10,000 PPS, which is still too slow for large scale VoIP applications. For example, process-switching the VoIP traffic with RTP header compression on an optical carrier (OC)-3 fiber link (155 Mega) requires at least seventy-five (75) high-end Cisco™ 7500 series routers.

Thus, there exists a need for a scheme that allows the IP router to transparently switch various multimedia content with a compressed RTP header at its native speed (million PPS) through the IP network, such as switching digitized VoIP network.

BRIEF DESCRIPTION OF THE DRAWINGS

A preferred embodiment of the invention is now described, by way of example only, with reference to the accompanying drawings in which.

DETAILED DESCRIPTION OF THE PREFERRED EMBODIMENT

The preferred embodiment of the present invention describes the technical requirements for a high-speed multimedia content switch with a compressed IP header (e.g., real-time transport protocol (RTP)). The underlined IP network supports a multi-protocol label switch (MPLS). The present invention augments the header compression algorithm and the MPLS protocols to accommodate faster header compression functions through the IP network.

Figure 1:
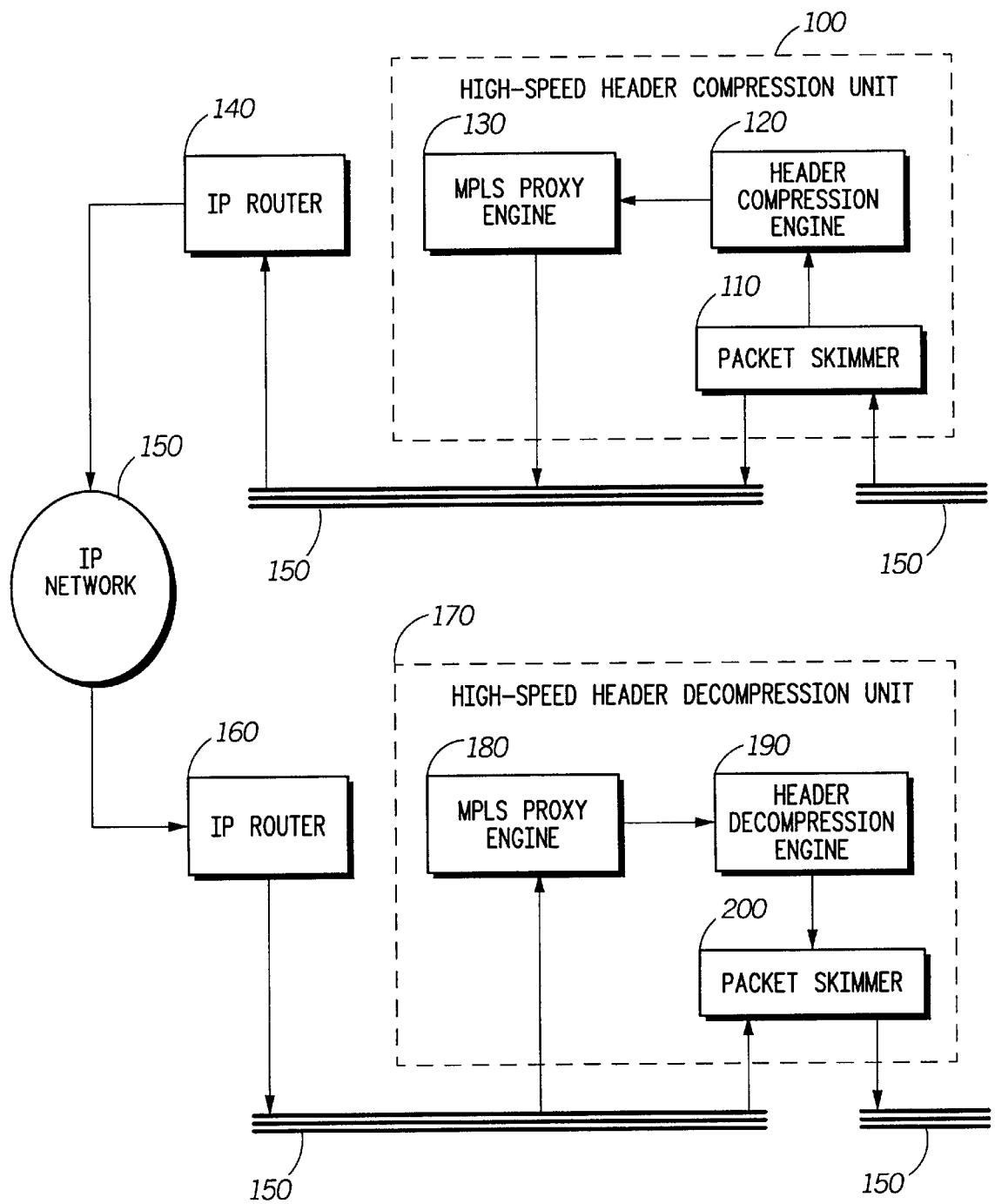
FIG. 1 illustrates a block diagram of the architecture of high-speed header compression and decompression units according to the preferred embodiment of the present invention.

FIG. 1 illustrates the architecture of a header compression unit 100 and a header decompression unit 170. The header compression unit 100 comprises three (3) components: a packet skimmer 110, a header compression engine 120 and a MPLS proxy engine 130. The header decompression unit 170 essentially comprises the same three (3) components as the header compression unit 100: a MPLS proxy engine 180, a header decompression engine 190 and a packet skimmer 200. The preferred embodiment of the present invention interconnects the header compression and decompression engines 120, 190 to a plurality of IP routers 140, 160 and the IP network 150 via the packet skimmers 110, 200 and the MPLS proxy engines 130, 180.

Figure 2:
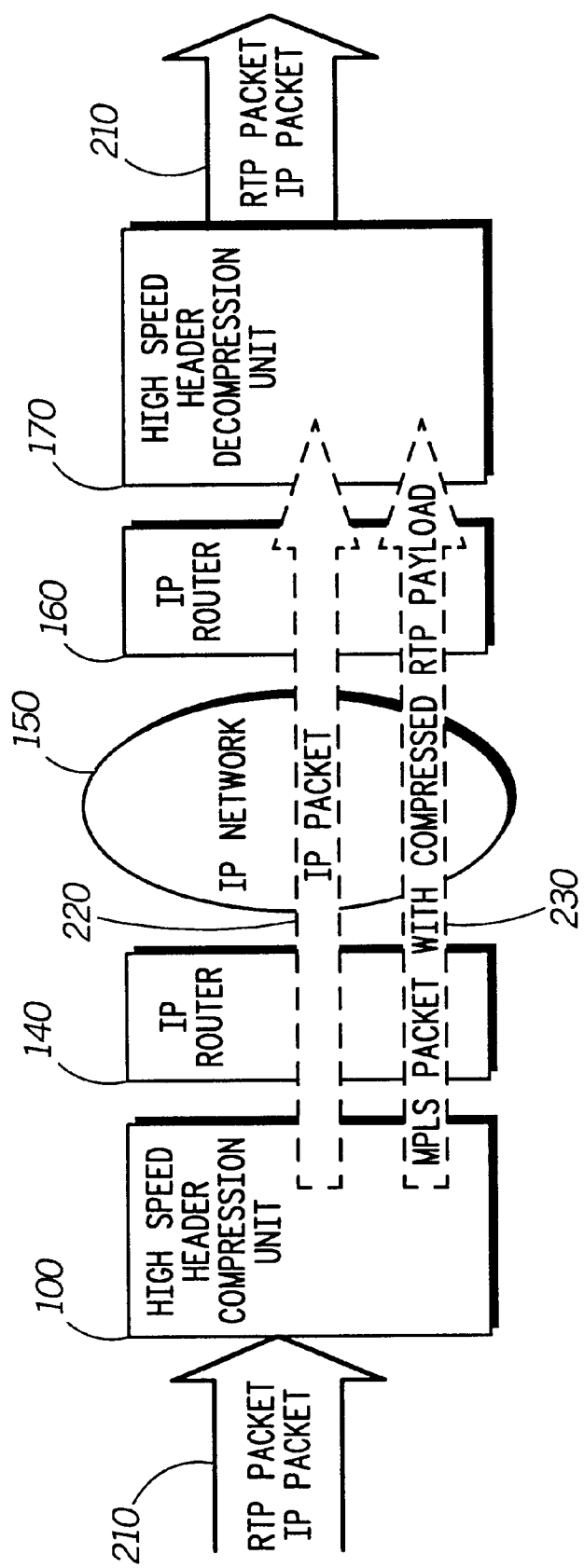
FIG. 2 illustrates a logic diagram of the net affect of the high-speed header compression and decompression units according to the preferred embodiment of the present invention.

FIG. 2 illustrates a logical diagram of the net effect of the header compression and decompression units 100, 170 according to the preferred embodiment of the present invention. In operation, IP packets 210 are fed into the header compression unit 100, via the packet skimmer 110, from the IP network 150. The packet skimmer 110 is an IP switch with the capability of matching the header and payload of the IP packet 210 with a predefined pattern at wire speed. The packet skimmer 110 has two (2) major functions.

First, the packet skimmer 110 takes the IP packets 210 from the IP network 150, processes the IP header and routes the IP packet 210 based on a routing table. The packet skimmer 110 exchanges IP routing information with directly connected IP routers 140 to build the dynamic routing entries in the routing table. A system administrator defines the static entries in the routing table. The IP header processing and routing are implemented in an application specific integrated circuit (ASIC) to meet the high-speed switching requirement.

Second, the packet skimmer 110 matches the IP packet 210 (both header and payload) with predefined patterns. These predefined patterns are based on the type of IP packet 210 that needs to be compressed by the header compression unit 100. For ease of explanation and clarification, the type of IP packet 210 that needs to be compressed (and later decompressed) is a RTP packet 210, even though any IP packet 210 can be used. If there is a match (i.e., the packet skimmer 110 identifies a RTP packet 210), the policies/actions associated with the pattern are executed. These policies/actions include, but are not limited to, the following: dropping the IP packet 210; switching the IP packet 210 to a port; multicasting the IP packet 210 to several ports; creating a copy of the IP packet 210 arid sending it to another port; modifying parts of the IP packet 210 (header and/or payload); and/or switching the IP packet 210 to a class of quality-of-services (QoS) queues based on the queuing policy. The pattern matching and actions are also implemented in the ASIC for high-speed processing and flexibility.

The packet skimmer 110 routes the RTP packets 210 to the header compression engine 120 and routes "non-RTP" 220 packets back to the IP network 150 unchanged. The header compression engine 120 receives the RTP packet 210 from the packet skimmer 110 and compresses the IP/UDP/RTP header based on an RTP header compression algorithm defined by an Internet Engineering Task Force (IETF) standard, which is well known in the art. The payload of the RTP packet 210 is then appended to the compressed IP/UDP/RTP header to form a compressed RTP packet. The header compression engine 120 transmits the compressed RTP packet to the MPLS proxy engine 130.

When the header compression engine 120 transmits the compressed RTP packet to the MPLS proxy engine 130, the header compression engine 120 informs the MPLS proxy engine 130 of the remote address for the intended header decompression unit 170. The header compression engine 120 requests that the MPLS proxy engine 130 establish a MPLS virtual circuit to the intended header decompression unit 170 in order for the plurality of IP routers 140, 160 to transmit the compressed RTP packet to its destination 170 without compression/ decompression at each IP router 140, 160. The MPLS virtual circuit between the header compression unit 100 and the header decompression unit 170 could be pre-established whenever there is a new unit (either a new header compression unit or a new header decompression unit) being dynamically discovered or static configured on the IP network 150. After the MPLS virtual circuit is setup, the header compression engine 120 and the header decompression engine 190 periodically exchange status information (heartbeat packet) through each MPLS virtual circuit. The heartbeat packets are used to make sure that the header compression engine 120, the MPLS proxy engine 130, the header decompression engine 190 and the MPLS proxy engine 180 are operational, and the MPLS virtual circuits between the header compression unit 100 and the header decompression unit 170 are working properly.

The MPLS proxy engine 130 receives the compressed RTP packet from the header compression engine 120 and creates the MPLS virtual circuit to the intended header decompression unit 170 using the MPLS protocol defined by the IETF standard (or looks for the pre-established MPLS virtual circuit). The MPLS proxy engine 130 appends a MPLS header to the compressed RTP packet (now called a MPLS packet 230) and transmits the MPLS packet 230 to the IP network 150.

After the MPLS proxy engine 130 transmits the MPLS packet 230 to the IP network 150, an IP router 140 retrieves the MPLS packet 230 from the IP network 150 along with other IP packets 220 from the IP network 150. The IP router 140 transmits the MPLS packet 230 with the compressed IP/UDP/RTP header and corresponding payload through the MPLS virtual circuit established across the IP network 150 in the compressed RTP format to the intended header decompression unit 170.

Once the MPLS packet 230 with compressed IP/UDP/ RTP header and its payload arrives at the MPLS proxy engine 180 at the header decompression unit 170, the MPLS proxy engine 180 strips the MPLS header and sends the compressed RTP packet to the header decompression engine 190 for decompressing the IP/UDP/RTP header. The header decompression engine 190 receives the compressed RTP packet from the MPLS proxy engine 180 and restores/ decompresses the IP/UDP/RTP header to the original RTP packet. The decompressed RTP packet is then sent to the packet skimmer 200 for normal IP routing and processing.

In summary, the header compression/ decompression units 100, 170 work as a pair. The MPLS proxy engines 130, 180 on each unit 100, 170 communicate through the plurality of IP routers 140, 160 to set up the MPLS virtual circuit between them. The RTP packet 210 is retrieved by the packet skimmer 110 on the header compression unit 100, compressed by the header compression engine 120, forwarded to the MPLS proxy engine 130, converted into a MPLS packet 230 and sent through the MPLS virtual circuit across the IP network 150 in the compressed RTP format. When the MPLS packet 230 is received by the MPLS proxy engine 180 at the header decompression unit 170, the compressed RTP packet is forwarded to the header decompression engine 190 for decompression and the restored/ decompressed RTP packet 210 is sent to the packet skimmer 200 for normal IP routing and processing.

The efficient RTP header compression/ decompression and fast IP switching described above in the preferred embodiment of the present invention allows a carrier to double the number of voice channels carried on a high-speed fiber link. The carrier can sell voice services to more customers without increasing the bandwidth of the IP network. Interconnecting the header compression and decompression engines 120, 190 to a plurality of IP routers 140, 160 and the IP network 150 via the packet skimmer 110, 200 and the MPLS proxy engines 130, 180 allows the preferred embodiment of the present invention to setup the MPLS virtual circuit. The MPLS virtual circuit avoids compression/ decompression of the IP packet at each IP router 140,160 (also referred to as "hop-by-hop compression/ decompression"), but rather only requires compression of the IP packet at the header compression unit 100 and decompression at the header decompression unit 170 (also referred to as "end-to-end compression/ decompression").

Figure 3:
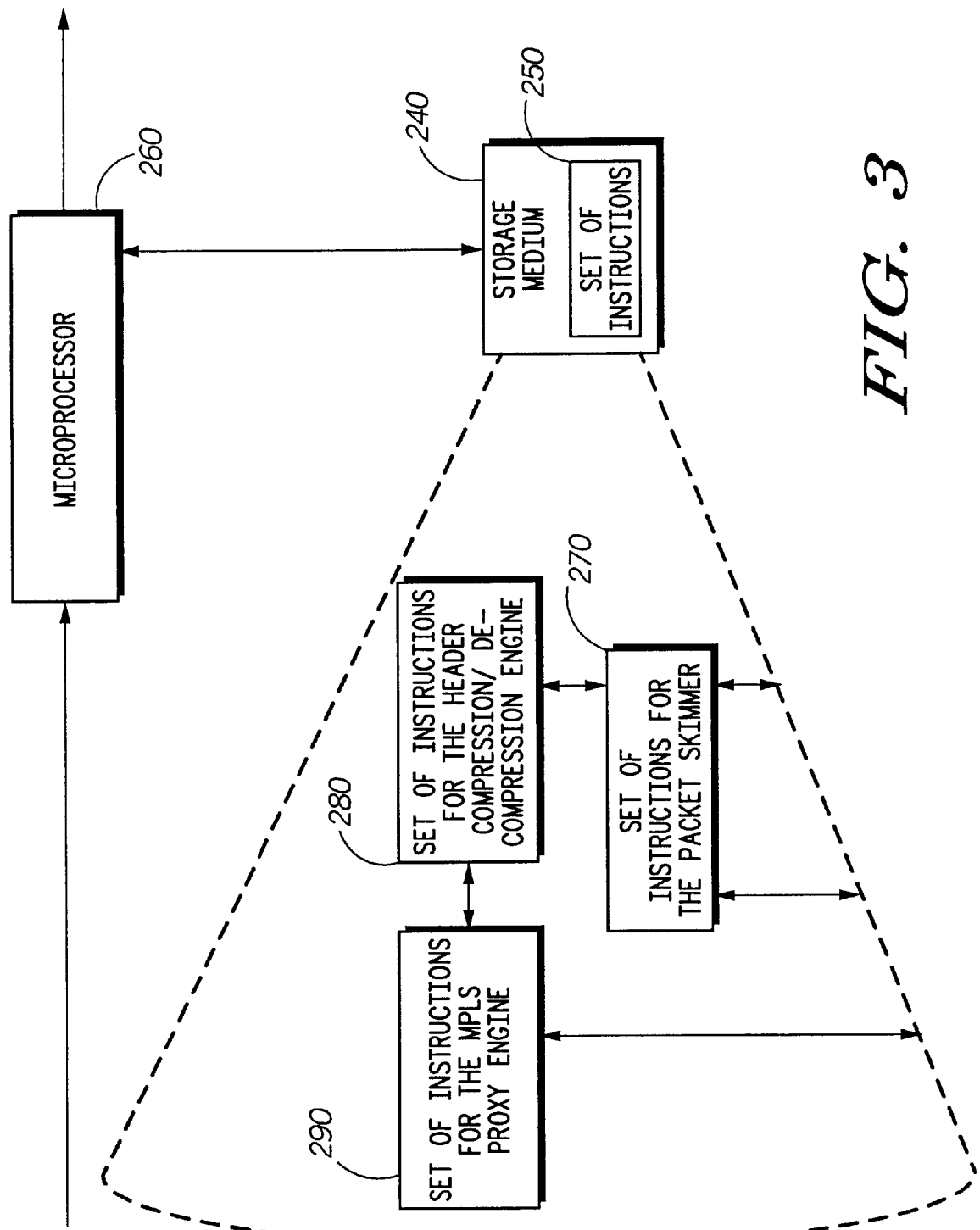
FIG. 3 illustrates a storage medium having stored thereon a set of instructions which, when loaded into a microprocessor, causes the microprocessor to perform a variety of functions according to the preferred embodiment of the present invention.

While the invention has been described in conjunction with a specific embodiment thereof, additional advantages and modifications will readily occur to those skilled in the art. For example, FIG. 3 illustrates a storage medium 240 having stored thereon a set of instructions 250 which, when loaded into a microprocessor 260, causes the microprocessor 260 to perform a variety of functions via the set of instructions 250 or a plurality of sets of instructions 270, 280, 290. The sets of instruction 250, 270, 280, 290 are applicable on the header compression unit 100 and the header decompression unit 170. On the header compression unit 100: set of instructions 270 retrieves an IP packet having a header and a payload; set of instructions 280 compresses the header of the IP packet and appends the payload to the compressed header to create a compressed IP packet; and set of instructions 290 establishes a MPLS virtual circuit through a plurality of IP routers terminating at a destination of the IP packet, converts the compressed IP packet into a MPLS packet and transmits the hAPLS packet through the MPLS virtual circuit. On the header decompression unit 170: set of instructions 290 re-converts the MPLS packet into the compressed IP packet; and the set of instructions 280 decompress the header of the IP packet.

The storage medium 240 can also have stored thereon a set of instructions 250 which, when loaded into the microprocessor 260, causes the microprocessor 260 to function as an apparatus for a high-speed multimedia content switch with a compressed Internet Protocol header comprising the components as shown in FIG. 1: a packet skimmer, coupled to an IP network; a header engine, coupled to the packet skimmer; and a multi-protocol label switch proxy engine, coupled to the header engine and coupled to an Internet router via the IP network; wherein the header engine is interconnected to the IP router and to the IP network via the multi-protocol label switch proxy engine and the packet skimmer.

The multi-tasked set of instructions 250 or each individual sets of instructions 270, 280, 290 can easily be created by a software programmer after a careful reading of the present invention. Moreover, the sets of instructions 250, 270, 280, 290 can be combined in any fashion by the software programmer and still achieve the same results.

The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

I claim:

1. A method for a high-speed multimedia content switch with compressed Internet Protocol (IP) header comprising:

at a header compression unit:
retrieving an IP packet having a header and a payload from an IP network;
compressing the header of the IP packet;
appending the payload to the compressed header to create a compressed IP packet;
establishing a multi-protocol label switch (MPLS) virtual circuit through a plurality of IP routers terminating at a header decompression unit of the IP packet, wherein the header decompression unit is the IP packet's final destination;
converting the compressed IP packet into a MPLS packet;
transmitting the MPLS packet through the MPLS virtual circuit; at the header decompression unit:
re-converting the MPLS packet into the compressed IP packet at the destination; and
decompressing the header of the IP packet.

2. The method according to claim 1 wherein the MPLS virtual circuit is pre-established whenever a new unit is dynamically discovered on the IP network, wherein the new unit is one of the following: a header compression unit and a header decompression unit.

3. The method according to claim 1 wherein the MPLS virtual circuit is pre-established whenever a new unit is statically configured on the IP network, wherein the new unit is one of the following: a header compression unit and a header decompression unit.

4. The method according to claim 1 wherein the step of converting the compressed IP packet into a MPLS packet comprises appending a MPLS header to the compressed IP packet, and the step of reconverting the MPLS packet into the compressed IP packet comprises stripping the MPLS header from the compressed IP packet.

5. The method according to claim 1 wherein the MPLS virtual circuit is created through a plurality of Internet Protocol routers that connects a header compression unit to a header decompression unit, and wherein the multi-protocol label switch packet is only decompressed once it reaches the header decompression unit.

6. The method according to claim 1 further comprising, after the step of retrieving, determining if the IP packet is of a particular IP header type; and discarding the IP packet unchanged if the IP packet is not of the particular IP header type.

7. The method according to claim 6 wherein the particular IP header type is one of the following: real-time transport protocol, user datagram protocol and transport control protocol.

8. The method according to claim 6 wherein the step of determining if the IP packet of a particular header type comprises matching the IP packet with a predefined pattern.

9. An apparatus for a high-speed multimedia content switch with a compressed Internet Protocol (IP) header comprising:
a packet skimmer, coupled to an IP network;
a header engine, coupled to the packet skimmer; and
a multi-protocol label switch proxy engine, coupled to the header engine and coupled to an Internet router via the IP network;
wherein the header engine is interconnected to the IP router and to the IP network via the multi-protocol label switch proxy engine and the packet skimmer.

10. The apparatus according to claim 9 wherein the header engine is a compression engine.

11. The apparatus according to claim 9 wherein the header engine is a decompression engine.

12. The apparatus according to claim 9 wherein the multi-protocol label switch proxy engine creates a virtual circuit through a plurality of IP routers.

13. The apparatus according to claim 9 wherein the packet skimmer processes and routes an IP packet based on a routing table.

14. A storage medium having stored thereon a set of instructions which, when loaded into a microprocessor, causes the microprocessor to perform the following functions:
retrieve an Internet Protocol (IP) packet having a header and a payload;
compress the header of the IP packet;
append the payload to the compressed header to create a compressed IP packet;
establish a multi-protocol label switch (MPLS) virtual circuit through a plurality of IP routers terminating at a destination of the IP packet;
convert the compressed IP packet into a MPLS packet;
transmit the MPLS packet through the MPLS virtual circuit;
re-convert the MPLS packet into the compressed IP packet at the destination; and
decompress the compressed IP packet at the destination.

15. A storage medium having stored thereon a set of instructions which, when loaded into a microprocessor, causes the microprocessor to function as an apparatus for a high-speed multimedia content switch with a compressed Internet Protocol header comprising:
a packet skimmer, coupled to an IP network;
a header engine, coupled to the packet skimmer; and
a multi-protocol label switch proxy engine, coupled to the header engine and coupled to an Internet router via the IP network;
wherein the header engine is interconnected to the IP router and to the IP network via the multi-protocol label switch proxy engine and the packet skimmer.

* * * * *